A. T. COLLIER.
CHANGE SPEED AND REVERSING GEAR.
APPLICATION FILED MAR. 18, 1918.
1,269,524.
Patented June 11, 1918.
4 SHEETS—SHEET 1.
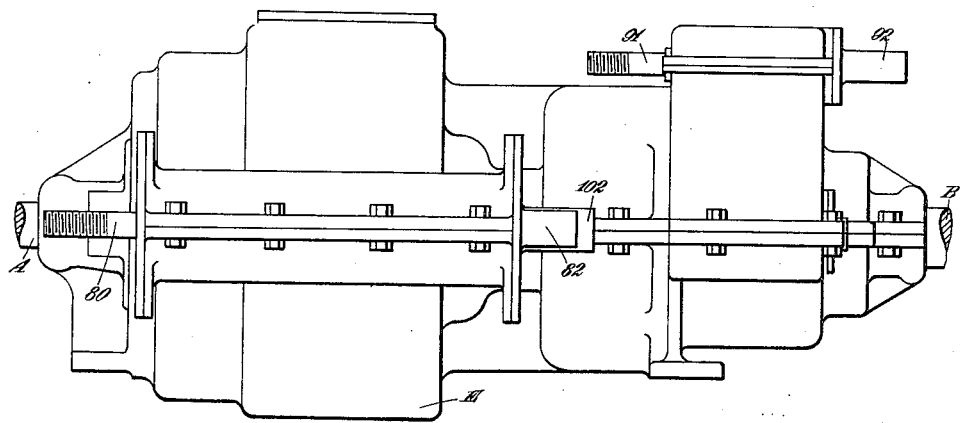
Fig. 1.
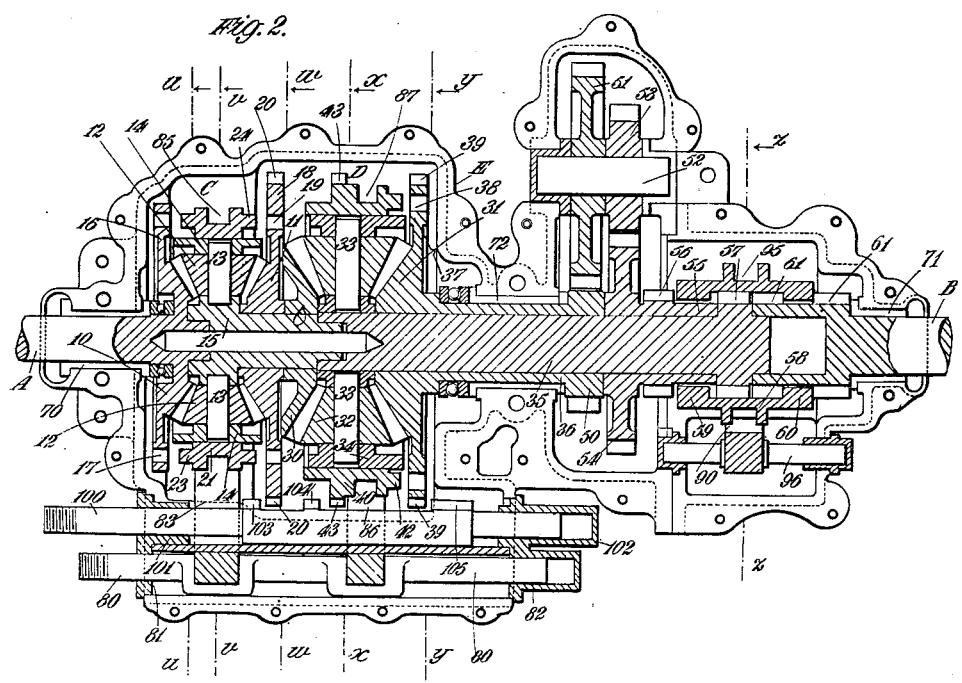

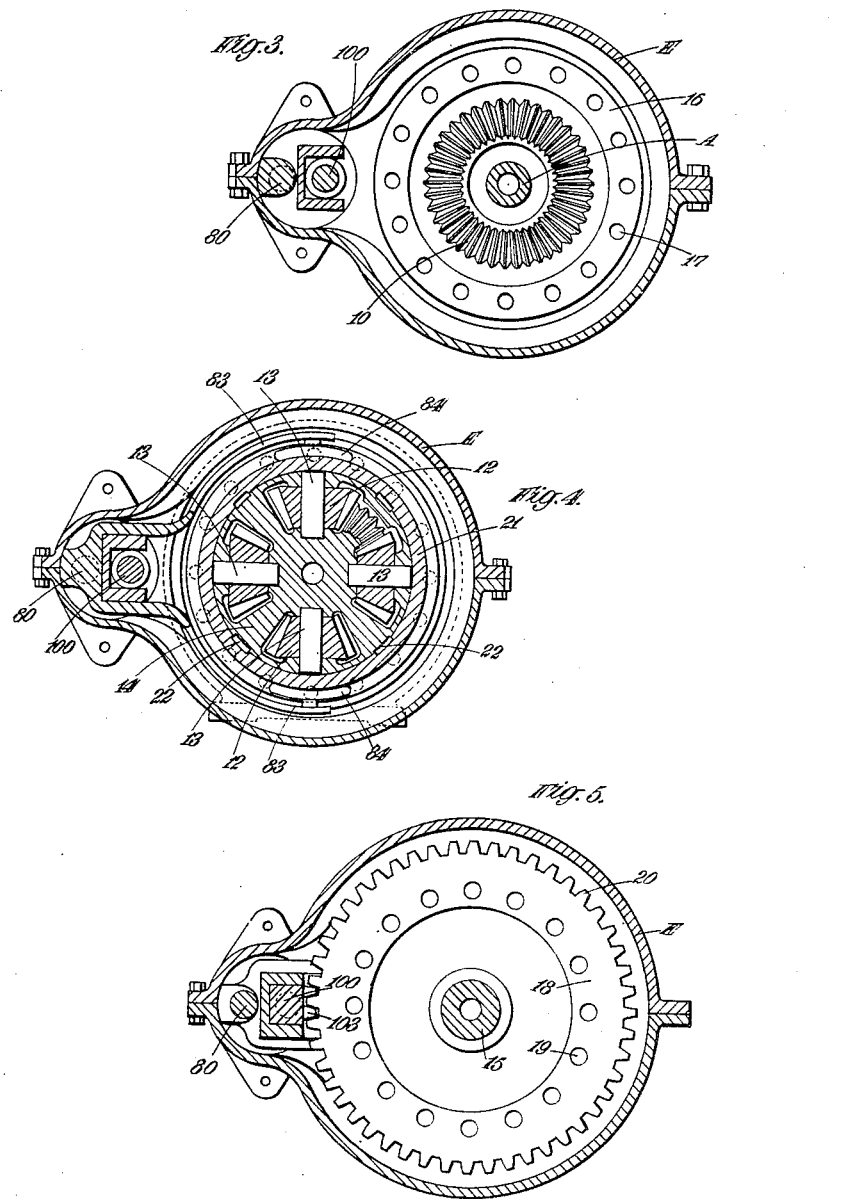

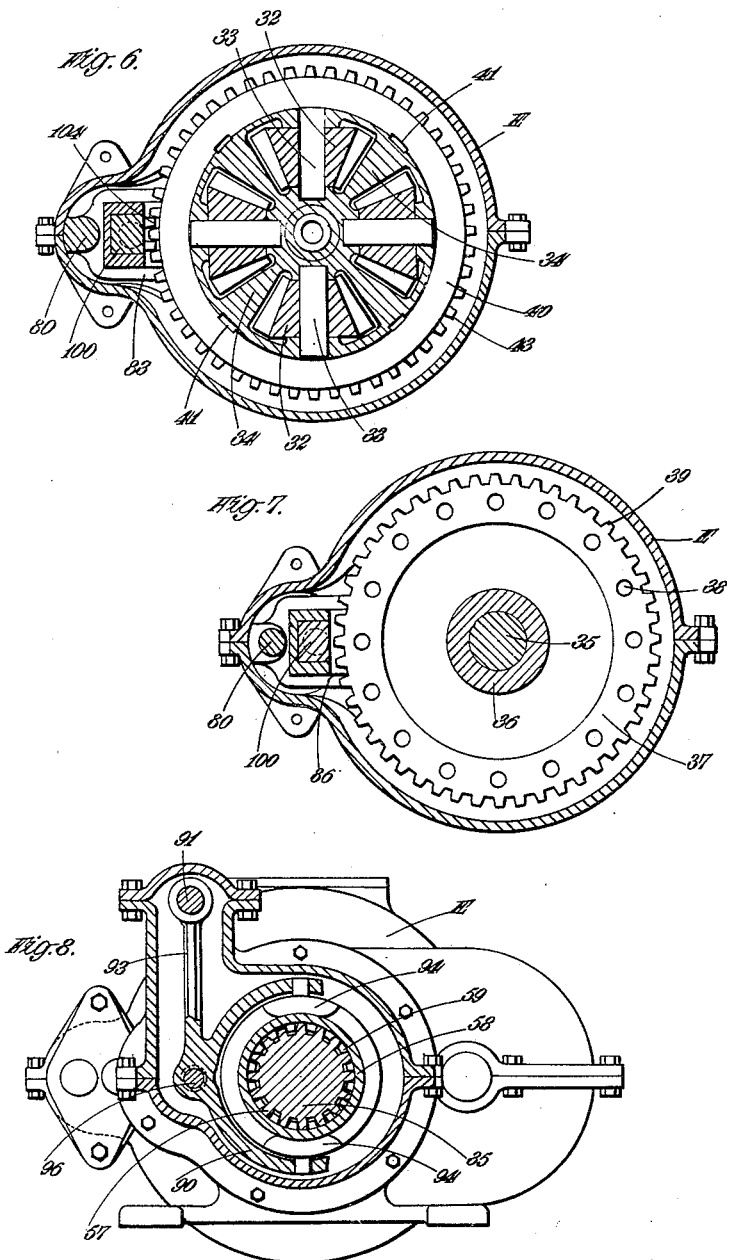

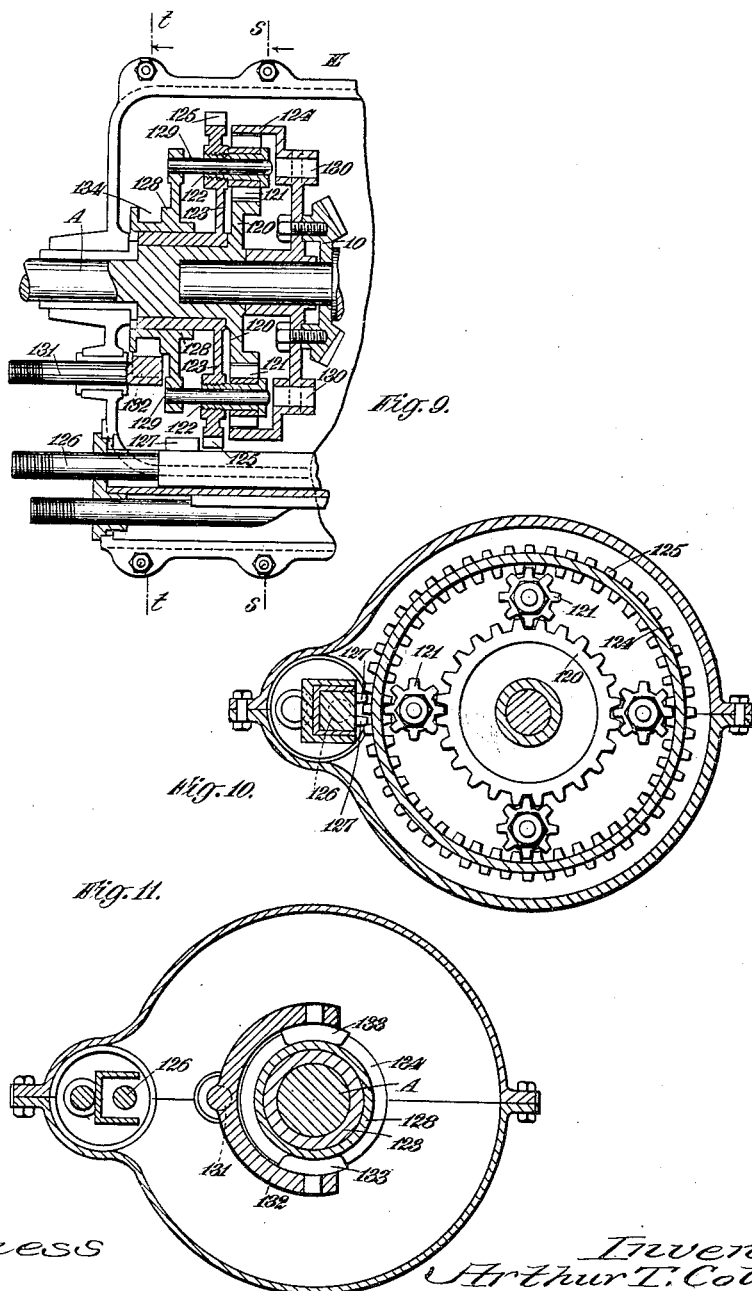

UNITED STATES PATENT OFFICE.

ARTHUR THOMAS COLLIER, OF ST. ALBANS, ENGLAND.

CHANGE-SPEED AND REVERSING GEAR.

1,269,524.  Specification of Letters Patent.  Patented June 11, 1918.

Application filed March 18, 1918. Serial No. 223,162.

*To all whom it may concern:*

Be it known that I, ARTHUR THOMAS COLLIER, a subject of the King of Great Britain, residing at St. Albans, Hertfordshire, England, have invented new and useful Improvements in Change-Speed and Reversing Gear, of which the following is a specification.

My invention relates to change-speed and reversing gear chiefly designed for use on self-propelled vehicles.

I employ two or more sets of bevel differential gear of the kind used on self-propelled vehicles for enabling one of two wheels on the same axis to rotate at a different speed to the other when the vehicle is moving in a curved path, but I use them for varying the speed between the engine or driving shaft and the driven shaft. According to my invention I connect such sets of bevel differential gears in series and arrange them co-axial with the driving and driven shafts, the power being transmitted in all combinations through all the component sets. By rendering inoperative as an epicyclic gear one or more of the component sets, the velocity-ratio of the driving and driven shafts can be altered.

My improved gear has the following advantages:—

1. It has a central drive for all speeds, *i. e.*, along the axis of the driving and driven shafts.

2. The working or driving teeth are always in mesh, so that no burring or mutilation of the teeth of the driving wheels can occur when speeds are changed.

In the accompanying drawings Figures 1 to 8 show an arrangement comprising two bevel epicyclic gears in series and a reverse at the end of the train next the driven shaft.

Fig. 1 is a side elevation of the gear casing;

Fig. 2 is a central sectional plan of the gear; and

Figs. 3, 4, 5, 6, 7 and 8 are transverse sections on the lines *u, u; v, v; w, w; x, x; y, y;* and *z, z,* respectively of Fig. 2.

In Figs. 9 to 11 a modification is illustrated in which the reversing gear is arranged next the driving shaft.

Fig. 9 is a longitudinal section of the reversing gear, the epicyclic gears completing the train being the same as in Figs. 1 to 8.

Fig. 10 is a transverse section on the line *s, s* of Fig. 9, and

Fig. 11 is a section on the line *t, t,* Fig. 9.

In these figures A is the primary driving shaft, B is the final driven shaft, C, D are two bevel epicyclic sets of gears in series, and E is the box or casing. The first epicyclic set of gears C comprises a driving wheel 10 fixed on the shaft A, a fulcrum wheel 11, and intermediate pinions 12, 12 mounted on transverse spindles 13, 13 carried by a frame 14 fixed on a second driving shaft 15. The primary driving wheel 10 has fixed to it a disk 16 in which are a number of holes 17 arranged in a circle. The fulcrum wheel 11 is mounted loosely on the shaft 15 and to it is fixed a disk 18 in which are a number of holes 19 also arranged in a circle. The periphery of the disk 18 is also provided with teeth 20. On the frame 14 is mounted a sleeve 21 capable of sliding axially on the frame 14 but prevented by keys 22 from turning on said frame. This sleeve is furnished on one side with pins 23 which, when the sleeve is moved to the left in Fig. 1 from its neutral position, engage with the holes 17 in the disk 16 and lock said disk 16 to the sleeve 21 and, consequently, to the frame 14. Said sleeve is also furnished on the other side with pins 24 which, when the sleeve is moved to the right in Fig. 1 from its neutral position, engage with the holes 19 in the disk 18 and lock said disk 18 to the sleeve 21 and, consequently, to the frame 14. In the neutral position of the sleeve 21 the pins 23 and 24 are clear of both disks 16 and 18.

The second set of bevel epicyclic gears D comprises a driving wheel 30 fixed on the second driving shaft 15, a fulcrum wheel 31 and intermediate pinions 32, 32 mounted on transverse spindles 33, 33 carried by a frame 34 fixed on a third driving shaft 35 which is in line with the primary driving shaft A and the second driving shaft 15. The fulcrum wheel 31 is fixed on a hollow reverse shaft 36 surrounding the third driving shaft 35. To the fulcrum wheel 31 is fixed a disk 37 in which are a number of holes 38 arranged in a circle. The periphery of the disk 37 is also provided with teeth 39. On the frame 34 is mounted a sleeve 40 capable of sliding axially on the frame 34 but prevented by keys 41 from turning on said frame 34. The sleeve 40 is furnished on one side with pins 42 which, when the sleeve is moved to the right in Fig. 1, engage with the holes 38 in the disk 37 and lock said disk 37 to the sleeve 40 and, consequently, to the frame 34.

In the neutral position of the sleeve 40 the pins 42 are clear of the disk 37. The sleeve 40 is moreover furnished on its periphery with teeth 43. In some cases the pins 42 may be arranged on the other side of the sleeve 40 so as to lock with holes in the disk 18 when the sleeve is moved to the left.

On the hollow or reverse shaft 36 is fixed a pinion wheel 50 engaging with a pinion wheel 51 fixed on a spindle 52. On said spindle 52 is also fixed a pinion wheel 53 engaging with a pinion wheel 54 fixed on a hollow shaft or sleeve 55 also surrounding the shaft 35. Said hollow sleeve 55 is furnished with teeth 56, and the shaft 35 is also furnished with similar teeth 57.

A clutch-member 58 is furnished with internal teeth 59 which, when the clutch-member is moved to the left in Fig. 1, engage with the teeth 56 on the reverse shaft 55 and when moved to the right engage with the teeth 57 on the third driving shaft 35. Said clutch-member is further provided with a second set of internal teeth 60 which engage with teeth 61 on the final driven shaft B. The teeth 60 and 61 always remain in gear but in the neutral position of the clutch-member its teeth 59 are disengaged from both the teeth 56 and the teeth 57.

The primary driving shaft A is supported by a bearing 70, the final driven shaft B by a bearing 71, and the hollow reverse shaft 36 is supported by a bearing 72 in the casing E.

The sleeves 21 and 40 are actuated by means of a rod 80 which can slide to and fro in bearings 81 and 82 in the casing E and which carries two forks 83 and 86. The fork 83 carries two arc-shaped blocks, 84, 84 which are received in an annular groove 85 in the periphery of the sleeve 21, and the fork 86 carries two similar blocks 88, 88 which are received in an annular groove 87 in the periphery of the sleeve 40.

The clutch-member 58 is actuated through a fork 90 by a rod 91 sliding in a bearing 92, Fig. 1, in the casing E and an arm 93 which rigidly connects said rod 91 to the fork 90. Said fork 90 carries a pair of blocks 94, 94 which are received in an annular groove 95 in the periphery of the clutch-member 58. The fork 90 is supported by and slides on a spindle 96 carried by the casing E.

Another rod 100, sliding in bearings 101, 102 in the casing E, is furnished with dogs or teeth 103, 104 and 105 for engaging respectively with the teeth 20 of the disk 18, the teeth 43 of the sleeve 40, and the teeth 39 of the disk 37.

In the position shown, the teeth or dogs 103, 104 and 105 are all clear of their respective engaging teeth. If the rod 100 is moved to the right from the position shown the dogs 103 engage with the teeth 20 and during the same movement the dogs 104 engage with the teeth 43, and when so engaged the disk 18 and the sleeve 40 are both locked and prevented from rotating.

If the rod 100 is moved to the left from the position shown, the dogs 105 engage with the teeth 39 and in that position the disk 37 is locked and prevented from rotating, while the disk 18 and sleeve 40 are free to turn.

If the rod 100 is moved still farther to the left, the dogs 104 engage with the teeth 20 of the disk 18 and lock said disk while, at the same time, the disk 37 remains locked since the dogs or teeth 105 are made long enough to allow this further movement of the rod 100 without being disengaged from the teeth 39. Consequently in the last position of the rod 100 the disks 18 and 37 are both locked and the sleeve 40 is free to rotate.

By moving the rod 80 to the right in Fig. 2, both epicyclic gears become locked, and the third driving shaft 35 is then driven at the same speed as the engine, and therefore when the clutch-member is moved to the right, thereby clutching the shaft 35 to the final driven shaft B, the latter is driven at top speed.

By moving the rod 80 to the left, thereby locking the first epicyclic gear only, and moving the rod 100 sufficiently to lock the disk 37 and consequently also fulcrum wheel 31, the driven shaft B is rotated at half the engine speed.

By leaving the rod 80 in its neutral position and moving the rod 100 to the left sufficiently to lock both disks 18 and 37 and consequently both the fulcrum wheels 11 and 31, the final driven shaft B is rotated at a quarter of the engine speed.

The reverse drive is obtained by moving the rod 100 to the right, leaving the rod 80 in its neutral position, and moving the clutch-member to the left so as to clutch the hollow shaft 55 to the final driven shaft B.

If a reverse speed is not required, the clutch 58 is dispensed with and the shaft 35 is connected directly to the final driven shaft B.

In this case the driving or motor shaft A is integral with or has attached to it a spur wheel 120 which gears with epicyclic pinions 121, 121. Said pinions are carried by spindles 122, 122 (in this drawing shown tubular) fixed in a disk 123 the hub of which is mounted to turn freely on the shaft A. The pinions 121, 121 also gear with internal spur teeth on a wheel 124 to which wheel is fixed the driving wheel 10 of the first of the series of bevel epicyclic gears constructed and arranged as described with reference to Figs. 1 to 8. The periphery of the disk 123 is furnished with teeth 125, and the said disk can be locked and prevented from rotating by means of a bar 126 made to slide in the gear casing E, and which has a tooth 127 that engages with one or other of the teeth 125 when the bar is moved to the right from the position shown in Fig. 9. A sleeve 128 mounted freely on the hub of the disk 123, carries pins or bolts 129, 129 which pass longitudinally either through the tubular spindles 122, 122 or through bosses between the spindles and enter sockets 130, 130 in the wheel 124. When said pins 129, 129 are moved to the right from the position shown in Fig. 9, the disk 123, spur wheel 120 and wheel 124 are all locked together and revolve as a whole with the driving shaft A. When however the pins 129, 129 are withdrawn from the sockets 130, 130 of the wheel 124, as shown in the drawing, and the sliding bar 126 is moved to the right to lock the disk 123, the drive then takes place through the pinions 121, 121. Thus while the disk 123 stands still, the wheel 124 rotates in the opposite direction to the rotation of the driving shaft A, at a reduced speed dependent on the relative effective diameters of the spur wheel 120 and wheel 124 and the direction of rotation of the whole of the following trains is reversed.

If it is desired to reverse without reducing the speed, a set of bevel epicyclic gears is used similar to those shown in Figs. 1 to 8 in lieu of the spur gear arrangement shown in Figs. 9 to 11.

The pins or bolts 129, 129 are moved to and fro as required by a rod 131 which is connected to the sleeve 128 that carries said pins by a fork 132 carrying slide blocks 133, 133 working in an annular groove 134 in said sleeve.

The above arrangement presents the advantage that, as its first member runs at the speed of the engine- or motor-shaft, the dimensions of the set of epicyclic gear used for reversing and speed reduction may be small, as compared with arrangements in which the reversing gear runs at the slowest speed of the driven shaft and must consequently be made of large dimensions.

What I claim is:—

1. A change-speed gear comprising two sets of bevel epicyclic gears arranged axially in series, each set comprising a driving wheel, a fulcrum wheel, a rotary frame, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, means for holding stationary when desired the fulcrum wheel of the second set, and means for locking when desired the rotary frame of the second set to the fulcrum wheel of the second set.

2. A change-speed gear comprising two sets of bevel epicyclic gears arranged axially in series, each set comprising a driving wheel, a fulcrum wheel, a rotary frame, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, said means including a clutch, means for holding stationary when desired the fulcrum wheel of the second set, and means for locking when desired the rotary frame of the second set to the fulcrum wheel of the second set.

3. A change-speed gear comprising two sets of bevel epicyclic gears arranged axially in series, each set comprising a driving wheel, a fulcrum wheel, a rotary frame, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, and means for holding stationary when desired the rotary frame of the second set, to reverse the direction of rotation of the driven shaft.

4. A change-speed gear comprising two sets of bevel epicyclic gears arranged axially in series, each set comprising a driving wheel, a fulcrum wheel, a rotary frame, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, said means comprising a sleeve mounted on said frame, a key and keyway connecting the sleeve and frame so as to permit sliding of the sleeve on the frame while preventing turning of the sleeve on the frame, mechanisms on the sleeve which, when the sleeve is moved in the proper direction, engage with corresponding mechanisms on the adjacent fulcrum wheel, means for sliding the sleeve on the frame, means connecting the rotary frame of the second set to the driven shaft, means for holding stationary when desired the fulcrum wheel of the second set, and means for locking when desired the rotary frame of the second set to the fulcrum wheel of the second set.

5. A change-speed gear comprising two sets of bevel epicyclic gears arranged axially in series, each set comprising a driving wheel, a fulcrum wheel, a rotary frame, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means for locking when desired the rotary frame of the first set to the driving wheel of this set, said means comprising a sleeve mounted on said frame, a key and keyway connecting the sleeve and frame so as to permit sliding of the sleeve on the frame while preventing turning of the sleeve on the frame, mechanisms on the sleeve which, when the sleeve is moved in the proper direction, engages with corresponding mechanisms on the adjacent driving wheel, means for sliding the sleeve on the frame, means connecting the rotary frame of the second set to the driven shaft, means for holding stationary when desired the fulcrum wheel of the second set, and means for locking when desired the rotary frame of the second set to the fulcrum wheel of the second set.

6. A change-speed gear comprising two sets of bevel epicyclic gears arranged axially in series, each set comprising a driving wheel, a fulcrum wheel, a rotary frame, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, means for holding stationary when desired the fulcrum wheel of the second set, and means for locking when desired the rotary frame of the second set to the fulcrum wheel of the second set, the means for locking the rotary frames to their respective fulcrum wheels being coupled together so as to act simultaneously when moved to lock their respective fulcrum wheels.

7. A change-speed gear comprising two sets of bevel epicyclic gears arranged axially in series, each set comprising a driving wheel, a rotary frame, a fulcrum wheel, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, means for holding stationary when desired the fulcrum wheel of the second set, and means for locking when desired the rotary frame of the second set to the fulcrum wheel of the second set, the means for holding stationary the said fulcrum wheels comprising a fixed casing, a rod slidable in said casing, members on said rod serving respectively to engage the fulcrum wheels when the rod is moved, said members being so arranged that when the rod is moved in one direction from a neutral position one fulcrum wheel only is held stationary, and when moved in the opposite direction from the neutral position both fulcrum wheels are held stationary.

8. A change-speed gear comprising two sets of bevel epicyclic gears arranged axially in series, each set comprising a driving wheel, a rotary frame, a fulcrum wheel, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, means for holding stationary when desired the fulcrum wheel of the second set, means for locking when desired the rotary frame of the second set to the fulcrum wheel of the second set, and means for holding stationary when desired the rotary frame of the second set, said means for holding stationary the fulcrum wheels of the two sets and the rotary frame of the second set comprising a fixed casing, a rod slidable in the casing, members on said rod serving respectively to engage the two fulcrum wheels and said rotary frame, said members being so disposed that when the rod is moved in one direction the fulcrum wheel of the first set and the rotary frame of the second set only are held stationary, and when the rod is moved in the opposite direction the fulcrum wheel of the second set only is held stationary, and when the rod is moved still farther in the latter direction, both fulcrum wheels are held stationary.

9. A change-speed gear comprising two sets of bevel epicyclic gears arranged axially in series, each set comprising a driving wheel, a rotary frame, a fulcrum wheel, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, a set of gearing for reducing the speed of the driven shaft arranged between the fulcrum wheel of the second set of gears and the driven shaft, means for holding stationary when desired the fulcrum wheel of the second set, and means for locking when desired the rotary frame of the second set to the fulcrum wheel of the second set.

10. A change-speed gear comprising two sets of bevel epicyclic gears arranged axially in series, each set comprising a driving wheel, a rotary frame, a fulcrum wheel, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, means for holding stationary when desired the fulcrum wheel of the second set, and means for locking when desired the rotary frame of the second set to the fulcrum wheel of the second set, and a reversing gear arranged between the driving shaft and the driving wheel of the first set of gears.

11. A change-speed gear comprising two sets of bevel epicyclic gears arranged axially in series, each set comprising a driving wheel, a rotary frame, a fulcrum wheel, and planet wheels carried by said rotary frame, a primary driving shaft connected to the driving wheel of the first set of gears, a driven shaft, means connecting the rotary frame of the first set to the driving wheel of the second set, means for holding stationary when desired the fulcrum wheel of the first set, means for locking when desired the rotary frame of the first set to the fulcrum wheel of this set, means connecting the rotary frame of the second set to the driven shaft, means for holding stationary when desired the fulcrum wheel of the second set, and means for locking when desired the rotary frame of the second set to the fulcrum wheel of the second set, and a reversing and speed-reducing gear arranged between the driving shaft and the driving wheel of the first set of gears.

ARTHUR THOMAS COLLIER.

Witnesses:
CONRAD ARNOLD,
HERBERT ARTHUR BEESTON.